United States Patent [19]

O'Lenick, Jr.

[11] Patent Number: 5,475,125
[45] Date of Patent: Dec. 12, 1995

[54] SILICONE POLYESTER EMULSIFIERS

[75] Inventor: A. J. O'Lenick, Jr., Lilburn, Ga.

[73] Assignee: Siltech Inc., Norcross, Ga.

[21] Appl. No.: 376,895

[22] Filed: Jan. 23, 1995

[51] Int. Cl.⁶ .................................. C07F 7/08; C07F 7/18
[52] U.S. Cl. ............................................ 556/437; 556/441
[58] Field of Search ....................................... 556/437, 441

[56] References Cited

U.S. PATENT DOCUMENTS

| | | |
|---|---|---|
| 3,511,699 | 5/1970 | Sterman . |
| 4,139,546 | 2/1979 | Berger et al. ........................ 556/437 X |
| 4,378,459 | 3/1983 | Hardman et al. .................... 556/437 X |
| 4,988,504 | 1/1991 | Zotto et al. .......................... 556/441 X |
| 5,051,489 | 9/1991 | O'Lenick, Jr. . |
| 5,292,847 | 3/1994 | O'Lenick, Jr. .................... 556/437 UX |

Primary Examiner—Paul F. Shaver

[57] ABSTRACT

The invention discloses novel polyester emulsifiers. Compounds of the invention are made by reacting (a) a dimethicone copolyol, (b) a diacid and (c) a fatty alcohol alkoxylate containing 4 to 20 carbon atoms. The compounds of the invention by virtue of (a) the silicone group, (b) the fatty alcohol terminal group and (c) the polyoxyalkylene present in the compound are extremely efficient emulsifiers for a variety of oils at heretofore unknown levels.

18 Claims, No Drawings

SILICONE POLYESTER EMULSIFIERS

BACKGROUND OF THE INVENTION

1. Field of the Invention

The invention discloses novel polyester emulsifiers. Compounds of the invention are made by reacting (a) a dimethicone copolyol, (b) a diacid and (c) a fatty alcohol alkoxylate containing 4 to 20 carbon atoms. The compounds of the invention by virtue of (a) the silicone group, (b) the fatty alcohol terminal group and (c) the polyoxyalkylene present in the compound are extremely efficient emulsifiers for a variety of oils at heretofore unknown levels.

The esterification by which the compounds are prepared is the reaction of a dimethicone copolyol, a hydroxy containing silicone polymer which may contain varying amounts of polyoxyalkylene in the molecule, a dicarboxylic acid and a fatty alcohol alkoxylate. Since the fatty alkoxylate contains only one hydroxyl group, it will become a terminal group in the polyester.

2. Arts and Practices

Silicone compounds have been known to be active at the surface of plastic, cellulosic and synthetic fibers as well as paper. They are good nondurable lubricants and are very stable to oxidation, however, their high cost and lack of efficiency at low concentrations as well as low durability have made their acceptance in commercial products quite low. In all instances, commercially available quaternaries are the active ingredient in traditional laundry care markets, with little or no silicone added.

The low efficiency and low durability of dimethylpolysiloxane is due to the fact that it is very water insoluble and deposits on the surface to obtain a minimum free energy in the solution. Simply, the silicone oil delivery to the surface by hydrophobic binding, not chemical bonding. At the surface, the dimethylpolysiloxane is a very effective fiber lubricant, however, there are two drawbacks, first; the dimethylpolysiloxane is not chemically bonded so the effect is very transient and disappears with one washing, and second; since there is no reaction of the dimethylpolysiloxane to the surface an equilibrium between fiber absorbed dimethylpolysiloxane and dimethylpolysiloxane in the dispersion results in very inefficient percentage of silicone deposited. A large amount of the expensive silicone goes down the drain with the waste water.

In many applications, there is a strong desire to obtain a solid wax which can be used in applications were a spread on application is of interest. These applications include personal care applications like antiperspirants and skin creams. Unfortunately most silicone derivatives are liquid to very low temperatures. Attempts to overcome this deficiency have been made by reacting stearyl alcohol with a chloro silane. The difficulty with the use of this type of material is that a large excess (50% by weight) of the alcohol needs to be added to get a product which is free of the irritating chlorosilane raw material. When such an excess is used the product behaves functionally more like the stearyl alcohol than like a silicone compound. Additionally, the compound is not polymeric, hence the superior lubrication and hydrophobicity enhancements which can be achieved by dimethylpolysiloxane is not obtainable with these compounds.

U.S. Pat. No. 3,511,699 to Sterman issued May 12, 1970 teaches that epoxy compounds placed in the silicone backbone by hydrosilation can be cured onto certain fibers to give improved substantivity. The substantivity is based upon the reaction of hydroxyl groups on the cellulosic and the epoxy group in the silicone polymer. The resulting bond is a ether linkage and a new hydroxyl group. While a definite improvement over other compounds the efficiency and durability of the were not good enough to allow for cost effective incorporation of these materials in detergent formulations.

U.S. Pat. No. 5,051,489 issued to O'Lenick, Jr. teaches that silicone esters can be prepared by the reaction of silanols and fatty acids. These compounds lack fatty alkoxy group needed for emulsification.

THE INVENTION

OBJECT OF THE INVENTION

It is the object of the present invention to provide emulsifiers which are effective at very low concentrations. These emulsifiers are effective for making emulsions of various oily materials including but not limited to triglycerides, silicone oil, mineral oil and fatty esters.

The formation of oil in water emulsions results in the placing of the oil in a micelle. The concentration of emulsifier needed to make a micelle stable is an important variable in the ability to deliver the oil to a substrate being tested. For example, if it is the desire to deliver silicone oil to a textile substrate from aqueous emulsion, it is desirable to deliver as much of the oil from the micelle efficiently to the surface. The greater the concentration of emulsifier, the greater the micelle will resist delivering the oil contained therein. The undelivered oil in the emulsion goes down the drain, and is wasted. It is therefore very desirable to develop an emulsifier which gives stable emulsions but is present in minimal concentration so as to allow for through and efficient delivery of the oil to the substrate being treated. The compounds of the present invention are such compounds. They are effective emulsifiers at concentrations as low as 0.05%

The incorporation of the fatty alcohol alkoxylate into the polyester's terminal portion results in the improved the efficient emulsification.

SUMMARY OF THE INVENTION

The present invention relates to novel fatty alcohol alkoxylate containing silicone polyester compounds. Compounds of the invention by virtue of (a) the polyester group, (b) the fatty alcohol alkoxylate terminal groups and (c) the polyoxyalkylene portion of the molecule present in the dimethicone copolyol are extremely efficient emulsifiers for a variety of oils. The emulsions give a good pay off when applied to substrate, that is they efficiently deliver the oil from the micelle, allowing the oil to spread out when applied to a variety of substrates including hair, skin, wood, plastic and textile fibers. The compounds of the present invention are prepared by reacting a dimethicone copolyol compound with a polycarboxylic acid and a fatty alcohol alkoxylate.

The compounds of this invention are made by the esterification of a dicarboxylic acid, ester or anhydride, a dimethicone copolyol compound and a fatty alcohol alkoxylate. Specifically, the compounds of the present invention are fatty alkoxylate terminated polyesters compounds which is prepared by the esterification reaction of;

(a) a dimethicone copolyol compound conforming to the following structure;

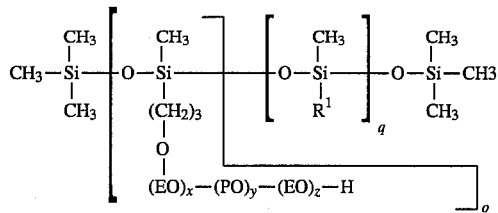

wherein;
$R^1$ is selected from the group consisting of $CH_3$ and phenyl;
EO is $—(CH_2—CH_2—O—)—$
PO is $—(—CH_2—CH(CH_3)—O—)—$
o is an integer ranging from 1 to 20;
q is an integer ranging from 0 to 200;
x, y and z are integers each ranging from 0 to 20;

(b) a diacid selected from the group consisting of
$HO(O)C—(CH_2)_c—C(O)OH$, $HO(O)C—(CH_2)_d—$ 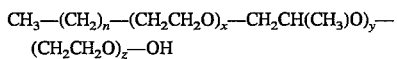 and dimer acid;
c, d and e are independently integers from 1 to 10; and (c) a fatty alcohol alkoxylate conforming to the following structure $$CH_3—(CH_2)_n—(CH_2CH_2O)_x—CH_2CH(CH_3)O)_y—(CH_2CH_2O)_z—OH$$

n is ranges from 3 to 19;
x, y and z are independently integers ranging from 0 to 20;

Dimer acid is well known to those skilled in the art and are prepared by the thermal condensation of unsaturated fatty acids catalyzed by a small amount of montmorillonite clay are described in numerous patents by C. G. Gobel (U.S. Pat. Nos. 2,482,761, 2,793,219, 2,793,220, 2,955,121, 3,076,003 and 3,100,784), incorporated herein by reference. Basically, dimer acid is the Diels Alder reaction of unsaturated mono fatty acids containing 18 carbon atoms, to produce a 36 carbon diacid. There are basically three structures which result. They are;

| UNSATURATED SPECIES | |
|---|---|
| STRUCTURE | DESIGNATION |
| $CH_3—(CH_2)_8—CH—(CH_2)_7—C(O)—OH$<br>$CH_3—(CH_2)_7—CH=C—(CH_2)_7—C(O)—OH$ | Acyclic |
| (monocyclic structure) | Monocyclic |
| (bicyclic structure) | Bicyclic |

The compounds are then hydrogenated to remove the double bonds to give the following;

| HYDROGENATED SPECIES | |
|---|---|
| STRUCTURE | DESIGNATION |
| $CH_3-(CH_2)_8-CH-(CH_2)_7-C(O)-OH$<br>$\quad\quad\quad\quad\quad\quad\ \ \|$<br>$CH_3-(CH_2)_8-CH-(CH_2)_7-C(O)-OH$ | Acyclic |
| (cyclohexane ring structure with $(CH_2)_8-C(O)OH$, $(CH_2)_8-COOH$, $(CH_2)_6-CH_3$, $(CH_2)_4-CH_3$ substituents) | Monocyclic |
| (bicyclic ring structure with $(CH_2)_7-C(O)OH$, $(CH_2)_7-C(O)-OH$, $CH_3-(CH_2)_4-$, $(CH_2)_4-CH_3$ substituents) | Bicyclic |

The above structures both in the hydrogenated and unsaturated forms are collectively referred to as "dimer acid" and the derivatives are referred to as those derived from a dimer acid residue.

PREFERRED EMBODIMENTS

In a preferred embodiment diacid is dimer acid.

In another preferred embodiment the diacid is dodecanedioic acid.

In another preferred embodiment x+y+z is greater than zero.

In another preferred embodiment n ranges from 3 to 11.

In another preferred embodiment n is 3.

In another preferred embodiment n is 5.

In another preferred embodiment n is 7.

In another preferred embodiment n is 9.

In another preferred embodiment n is 11.

In another preferred embodiment n is 13.

In another preferred embodiment n is 15.

In another preferred embodiment n is 17.

In another preferred embodiment n is 19.K

In an especially preferred embodiment, two fatty alcohols having differing n, x, y and z values are blended and reacted with the other reactants. The selection of the blended fatty alcohols allows for the synthesis of extremely effective emulsifiers. The concentrations at which these emulsifiers are effective is heretofore unknown.

In this especially preferred embodiment the compounds of this invention are made by the esterification of a dicarboxylic acid, ester or anhydride, a dimethicone copolyol compound and a blend of fatty alcohol alkoxylate. Specifically, the compounds of the present invention are fatty alkoxylate terminated polyesters compounds which is prepared by the esterification reaction of;

(a) a dimethicone copolyol compound conforming to the following structure;

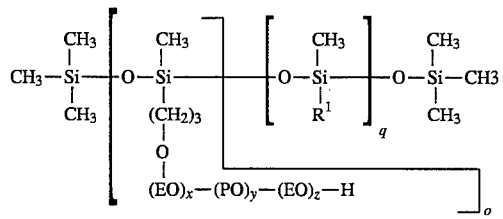

wherein;
$R^1$ is selected from the group consisting of $CH_3$ and phenyl;
EO is $-(CH_2-CH_2-O-)-$
PO is $-(-CH_2-CH(CH_3)-O-)-$
o is an integer ranging from 1 to 20;
q is an integer ranging from 0 to 200;
x, y and z are independently integers each ranging from 0 to 20;

(b) a diacid selected from the group consisting of $HO(O)C-(CH_2)_c-C(O)OH$, $HO(O)C-(CH_2)_d-CH=CH-(CH_2)_e-C(O)OH$ and dimer acid;
c, d and e are independently integers from 1 to 10; and (c) a blend of fatty alcohol alkoxylates conforming to the following structures;

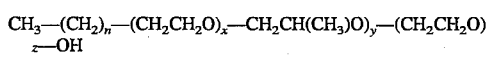

n is ranges from 3 to 19;

x, y and z are independently integers ranging from 0 to 20;

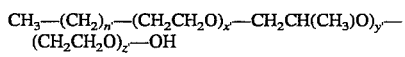

n' is ranges from 3 to 19;

x', y' and z' are independently integers ranging from 0 to 20; with the proviso that n', x', y' and z' are not all the same as n, y, y, and z.

EXAMPLES

The compounds of the present invention are prepared by the reaction of a dimethicone copolyol compound a diacid and a fatty alcohol alkoxylate. Examples of suitable reactants are as follows;

Reactants

| Diacids | Formula | Molecular Weight |
|---|---|---|
| Adipic Acid | HO(O)C(CH$_2$)4C(O)OH | 130 |
| Succinic Acid | HO(O)C(CH2)2C(O)OH | 102 |
| Dodecanedioic Acid | HO(O)C(CH2)10C(O)OH | 230 |
| Dimer Acid | See Above | 286 |
| Maleic Acid | HO(O)C—CH=CH—C(O)OH | 100 |

Dimethicone Copolyol Compounds

Dimethicone Copolyol compounds are well known and are marketed in the trade under many names. The compounds conform to the following generic structure;

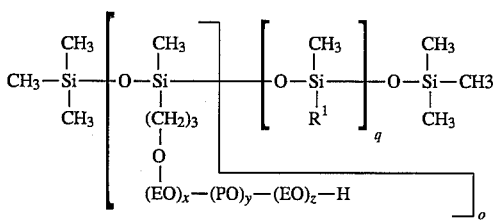

wherein;

R$^1$ is selected from the group consisting of CH$_3$ and phenyl;

EO is —(CH$_2$—CH$_2$—O—)—

PO is —(—CH$_2$—CH(C$_3$)—O—)— o is an integer ranging from 1 to 20;

q is an integer ranging from 0 to 200;

x, y and z are independently integers each ranging from 0 to 20;

| Name | x | y | z | o | q |
|---|---|---|---|---|---|
| Siltech H 1000 | 3 | 0 | 0 | 2 | 54 |
| Siltech H 1100 | 10 | 5 | 10 | 10 | 100 |

-continued

| Name | x | y | z | o | q |
|---|---|---|---|---|---|
| Siltech H 1200 | 20 | 20 | 20 | 2 | 56 |
| Siltech H 1300 | 10 | 10 | 10 | 6 | 26 |
| Siltech H 1400 | 0 | 10 | 0 | 4 | 200 |
| Siltech H 1500 | 5 | 5 | 5 | 2 | 50 |
| Siltech H 1600 | 0 | 6 | 0 | 10 | 25 |
| Siltech H 1700 | 0 | 0 | 0 | 5 | 10 |

These materials are available from Siltech Inc. Norcross Ga.

Fatty Alcohol Alkoxylates

Fatty alcohol alkoxylates are commercially available from a variety of suppliers, one supplier is Ethox Chemical of Spartanburg S.C. Fatty Alcohol alkoxylates conform to the following structure;

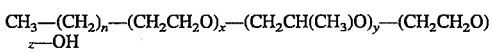

n is ranges from 3 to 19;

x, y and z are independently integers ranging from 0 to 20;

| Reactant Example Number | n Value | x Value | y Value | z Value |
|---|---|---|---|---|
| 1 | 3 | 0 | 0 | 0 |
| 2 | 7 | 10 | 10 | 10 |
| 3 | 9 | 10 | 5 | 0 |
| 4 | 11 | 0 | 15 | 0 |
| 5 | 13 | 10 | 5 | 10 |
| 6 | 15 | 20 | 20 | 20 |
| 7 | 17 | 0 | 0 | 5 |
| 8 | 19 | 20 | 0 | 0 |

Compounds of the Invention

The reaction can be run with varying amounts of fatty alcohol alkoxylate. It should be clear that since only the fatty alkoxylate contains only one hydroxyl group it will be chain terminating. The other materials, namely the dimethicone copolyol and the diacid each have two functional groups.

Polymers of the following structure will result;

wherein;

A is the fatty alcohol alkoxylate;

B is the diacid

C is the dimethicone copolyol

The less amount of "A" used, the higher the "s" value, and the lower the fatty content. That is because "A" is both a chain stopper and the fatty source.

| | "A" Concentration High | "A" Concentration Low |
|---|---|---|
| Molecular weight | Low | High |
| Fatty Content | High | Low |
| "s" value | Low | High |

General Reaction Conditions

The esterification can be run without catalyst; however, when no catalysts used reaction rates are less efficient. Standard esterification catalysts are generally used at concentrations of between 0.05% to 0.50% with a preferred range of 0.1% to 0.3%. Catalysts which are effective include but are not limited to; sulfuric acid, p-toluene sulfonic acid, methane sulfonic acid, tin metal, zinc metal, titanium metal, organo titianates, organo tin compounds, organo zinc compounds, zinc oxide, magnesium oxide, calcium oxide, etc. The most preferred catalyst is stannous oxylate. The reaction is conducted at between 140° and 240° C. under an inert nitrogen blanket. The nitrogen blanket preserves the color. Preferred temperature range is between 180° and 210° C. Water is removed from the reaction which is done using a nitrogen sparge or vacuum.

EXAMPLES

General Procedure

Into a suitable round bottom, three neck flask equipped with a Dean Stark trap, a thermometer and a nitrogen sparge is added the specified number of grams of the diacid, the specified number of grams of dimethicone copolyol, the specified number of grams of fatty alcohol alkoxylate and 0.25% of total weight of the batch of catalyst. The reaction mass is blanketed with nitrogen, and heated to 180° and 200° C. under an inert nitrogen blanket. Once the reaction temperature reaches 120° C. water begins to boil off and is collected in the Dean Stark Trap. Within four to five hours the theoretical water is collected off and the acid value is very low. The product is used without additional purification.

Example 9

Into a suitable round bottom, three neck flask equipped with a Dean Stark trap, a thermometer and a nitrogen sparge is added the specified number of 130.0 grams of the Adipic Acid (the diacid), the 5,000.0 grams of Siltech H-1100 (the dimethicone copolyol), 74.0 grams of Reactant Example 1, (the fatty alcohol alkoxylate) and 0.25% of total weight of the batch of catalyst. The reaction mass is blanketed with nitrogen, and heated to 180° and 200° C. under an inert nitrogen blanket. Once the reaction temperature reaches 120° C. water begins to boil off and is collected in the Dean Stark Trap. Within four to five hours the theoretical water is collected off and the acid value is very low. The product is used without additional purification.

Example 10–33

Example 9 is repeated only this time substituting the specified number of grams of the specified diacid for the dimer acid and the specified type and number of grams of dimethicone copolyol and the specified type and number of grams of fatty alcohol alkoxylate compound as shown below;

Note; In the below table Gms. is grams

| Example | Diacid | Fatty Alcohol | Dimethicone Copolyol |
|---|---|---|---|
| 10 | Succinic Acid 102.0 Gms. | Reactant Example 2 1600 Gms. | H-1000 2,329.0 Gms. |
| 11 | Dodecanedioic Acid 230.0 Gms. | Reactant Example 3 893 Gms. | H-1100 2,032.0 Gms. |
| 12 | Dimer Acid 286.0 Gms. | Reactant Example 4 1071 Gms. | H-1200 5,129.0 Gms. |
| 13 | Hydrogenated Dimer Acid 286.0 Gms. | Reactant Example 5 1363 Gms. | H-1300 347.6 Gms. |
| 14 | Maleic Acid 100.0 Gms. | Reactant Example 6 3182 Gms. | H-1400 4,407.0 Gms. |
| 15 | Adipic Acid 130.0 Gms. | Reactant Example 7 490 Gms. | H-1500 2,783.0 Gms. |
| 16 | Succinic Acid 102.0 Gms. | Reactant Example 8 1178 Gms. | H-1600 3,550.7 Gms. |
| 17 | Dodecanedioic Acid 230.0 Gms. | Reactant Example 1 74 Gms. | H-1700 1,512.4 Gms. |
| 18 | Dimer Acid 286.0 Gms. | Reactant Example 2 1600 Gms. | H-1000 2,329.0 Gms. |
| 19 | Hydrogenated Dimer Acid 286.0 Gms. | Reactant Example 3 893 Gms | H-1100 2,032.0 Gms. |
| 20 | Maleic Acid 100.0 Gms. | Reactant Example 4 1071 Gms. | H-1200 2,129.0 Gms. |
| 21 | Adipic Acid 130.0 Gms. | Reactant Example 5 490 Gms. | H-1300 347.6 Gms. |
| 22 | Succinic Acid 102.0 Gms. | Reactant Example 6 3182 Gms. | H-1400 4,407.0 Gms. |
| 23 | Dodecanedioic Acid 230.0 Gms. | Reactant Example 7 490 Gms. | H-1500 2,738.0 Gms. |
| 24 | Dimer Acid 286.0 Gms. | Reactant Example 8 1178 Gms | H-1600 3,550.7 Gms. |
| 26 | Hydrogenated Dimer Acid 286.0 Gms. | Reactant Example 1 74 Gms. | H-1700 1,512.4 Gms |
| 27 | Maleic Acid 100.0 Gms. | Reactant Example 2 1600 Gms. | H-1700 1,512.4 Gms. |
| 28 | Adipic Acid 130.0 Gms. | Reactant Example 3 893 Gms. | H-1600 3,550.7 Gms. |
| 29 | Succinic Acid 102.0 Gms. | Reactant Example 4 1071 Gms. | H-1500 2,738.0 Gms. |
| 30 | Dodecanedioic Acid 230.0 Gms. | Reactant Example 5 1363 Gms. | H-1400 3,000.0 Gms. |
| 31 | Dimer Acid 286.0 Gms. | Reactant Example 6 3182 Gms. | H-1300 347.0 Gms. |
| 32 | Hydrogenated Dimer Acid 286.0 Gms. | Reactant Example 7 490 Gms. | H-1200 5,000.0 Gms. |
| 33 | Maleic Acid 100.0 Gms. | Reactant Example 8 1178 Gms. | H-1100 2,032.0 Gms. |

In a preferred embodiment, two fatty alcohols having differing n, x, y and z values are blended and reacted with the other reactants. The selection of the blended fatty alcohols allows for the synthesis of extremely effective emulsifiers. The concentrations at which these emulsifiers are effective is heretofore unknown.

It should be clearly understood, from the teaching of this invention, that the blending of the alcohols prior to the reaction to form the polyester results in a single molecule containing both fatty alcohol alkoxylates. The blending of the pre-formed polyesters of single alkoxylates results in a blend of single substituted polyesters which do not emulsify as effectively as the polyester made from the blended alcohols. This unexpected property of the compounds of the present invention results in unique emulsification properties.

Example 34

Into a suitable round bottom, three neck flask equipped with a Dean Stark trap, a thermometer and a nitrogen sparge is added the specified number of 130.0 grams of the Adipic Acid (the diacid), the 5,000.0 grams of Siltech H-1100 (the dimethicone copolyol), 34.0 grams of Reactant Example 1, and 245 gms of Reactant Example 7 (a different fatty alcohol alkoxylate) and 0.25% of total weight of the batch of catalyst. The reaction mass is blanketed with nitrogen, and heated to 180° and 200° C. under an inert nitrogen blanket. Once the reaction temperature reaches 120° C. water begins to boil off and is collected in the Dean Stark Trap. Within four to five hours the theoretical water is collected off ad the acid value is very low. The product is used without additional purification.

Example 35–44

Example 34 is repeated only this time substituting the specified number of grams of the specified diacid for the dimer acid and the specified type and number of grams of dimethicone copolyol and the specified type and number of grams of the two fatty alcohol alkoxylate compound as shown below;

| Example | Diacid | Fatty Alcohol Blend | Dimethicone Copolyol |
|---|---|---|---|
| 35 | Succinic Acid 102.0 Gms. | Reactant Example 2 800 Gms. Reactant Example 1 37 Gms | H-1000 2,329.0 Gms. |
| 36 | Dodecanedioic Acid 230.0 Gms. | Reactant Example 3 441 Gms. Reactant Example 2 800 gms | H-1100 2,032.0 Gms. |
| 37 | Dimer Acid 286.0 Gms. | Reactant Example 4 535 Gms. Reactant Example 8 600 gms | H-1200 5,129.0 Gms. |
| 38 | Hydrogenated Dimer Acid 286.0 Gms. | Reactant Example 1 74 Gms. Reactant Example 8 600 gms | H-1300 347.6 Gms. |
| 39 | Maleic Acid 100.0 Gms. | Reactant Example 6 1590 Gms. Reactant Example 1 37 gms | H-1400 4,407.0 Gms. |
| 40 | Adipic Acid 130.0 Gms. | Reactant Example 7 245 Gms. Reactant Example 2 800 gms | H-1500 2,783.0 Gms. |
| 41 | Succinic Acid 102.0 Gms. | Reactant Example 8 600 Gms. Reactant Example 2 800 gms | H-1600 3,550.7 Gms. |
| 42 | Dodecanedioic Acid 230.0 Gms. | Reactant Example 1 37 Gms. Reactant Example 5 666 gms | H-1700 1,512.4 Gms. |
| 43 | Dimer Acid 286.0 Gms. | Reactant Example 2 800 Gms. Reactant Example 4 535 Gms. | H-1000 2,329.0 Gms. |
| 44 | Hydrogenated Dimer Acid 286.0 Gms. | Reactant Example 3 438 Gms Reactant Example 1 40 Gms. | H-1100 2,032.0 Gms. |

The emulsifiers of the present invention were evaluated as emulsifiers for 60,000 viscosity poly dimethyl siloxane. The formula evaluated was:

| Grams | Material |
|---|---|
| 50.0 | 60,000 viscosity dimethylpolysiloxane |
| 50.0 | Water |

The minimum quantity of emulsifier which gave a stable emulsion was recorder. The lower the number the better the products emulsification properties. The results were as follows:

Prior Art
 Fatty Alcohol ethoxylate (non-silicone)
 $CH_3—(CH_2)_{17}—(CH_2CH_2—O)_{11}—H$
 1.8 Grams needed to emulsify
Compounds of the present invention (Single Alcohol)
 Example 11
 0.5 grams needed to emulsify
Preferred Compounds of the Present Invention (Alcohol Blends)
 Example 38
 0.3 grams needed to emuslify

What is claimed:

1. A silicone polyester compound which is prepared by the esterification reaction of;

(a) a dimethicone copolyol compound conforming to the following structure;

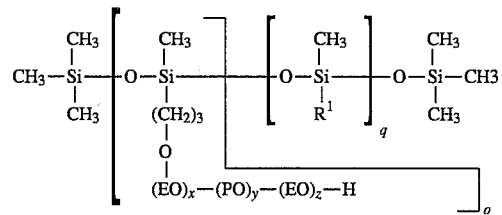

wherein;
 $R^1$ is selected from the group consisting of $CH_3$ and phenyl;
 EO is $—(CH_2—CH_2—O—)—$
 PO is $—(—CH_2—CH(CH_3)—O—)—$
 o is an integer ranging from 1 to 20;
 q is an integer ranging from 0 to 200;
 x, y and z are independently integers each ranging from 0 to 20:

(b) a diacid selected from the group consisting of $HO(O)C—(CH_2)_c—C(O))H$, $HO(O)C—(CH_2)_d—CH=CH—(CH_2)_e—C(O))H$ and dimer acid;
 c, d and e are independently integers from 1 to 10; and (c) a fatty alcohol alkoxylate conforming to the following structure;

$$CH_3—(CH_2)_n—(CH_2CH_2O)_x—CH_2CH(CH_3)O)_y—(CH_2CH_2O)_z—OH$$

n is ranges from 3 to 19;
x, y and z are independently integers ranging from 0 to 20.

2. A compound of claim 1 wherein the diacid is dimer acid.

3. A compound of claim 1 wherein the diacid is dodecanedioic acid.

4. A compound of claim 1 wherein x+y+z is greater than zero.

5. A compound of claim 1 wherein n ranges from 3 to 11.

6. A compound of claim 1 wherein n is 3.

7. A compound of claim 1 wherein n is 5.

8. A compound of claim 1 wherein n is 7.

9. A compound of claim 1 wherein n is 9.

10. A compound of claim 1 wherein n is 11.

11. A compound of claim 1 wherein n is 13.

12. A compound of claim 1 wherein n is 15.

13. A compound of claim 1 wherein n is 17.

14. A compound of claim 1 wherein n is 19.

15. A silicone polyester compound which is prepared by the esterification reaction of;

(a) a dimethicone copolyol compound conforming to the following structure;

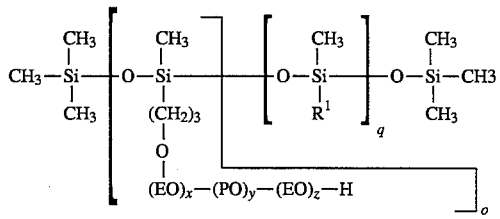

wherein;
$R^1$ is selected from the group consisting of $CH_3$ and phenyl;
EO is —$(CH_2-CH_2-O-)$—
PO is —$(-CH_2-C(CH_3)-O-)$—
is an integer ranging from 1 to 20:
q is an integer ranging from 0 to 200;
x, y and z are independently integers each ranging from 0 to 20;

(b) a diacid selected from the group consisting of HO(O)C—$(CH_2)_c$—C(O)OH, HO(O)C—$(CH_2)_d$—CH=CH—$(CH_2)_e$—C(O)OH and dimer acid;
c, d and e are independently integers from 1 to 10; and (c) a blend of fatty alcohol alkoxylates conforming to the following structures;

$CH_3$—(CH2)n—(CH2CH2O)x—CH2CH(CH3)O)y—(CH2CH2O)z—OH n is ranges from 3 to 19;
x, y and z are independently integers ranging from 0 to 20;

$CH_3$—$(CH_2)_{n'}$—$(CH_2CH_2O)_{x'}$—$CH_2CH(CH_3)O)_{y'}$—$(CH_2CH_2O)_{z'}$—OH n' is ranges from 3 to 19;
x', y' and z' are independently integers ranging from 0 to 20; with the proviso that
n', x', y' and z' are not all the same as n, y, y, and z.

16. A compound of claim 15 wherein the diacid is dimer acid.

17. A compound of claim 15 wherein the diacid is dodecanedioic acid.

18. A compound of claim 15 wherein x+y+z is greater than zero.

* * * * *